United States Patent Office 3,515,032
Patented June 2, 1970

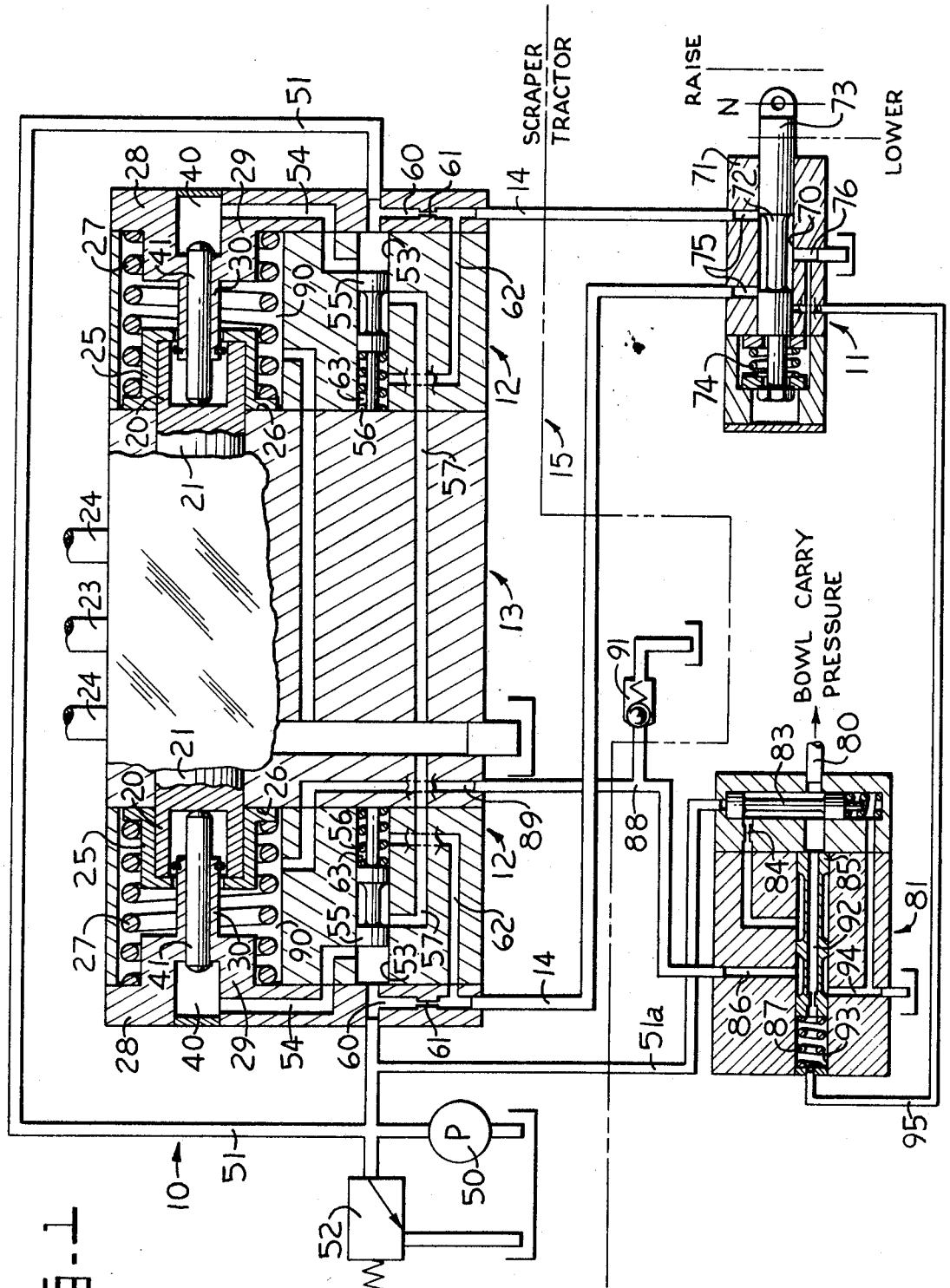

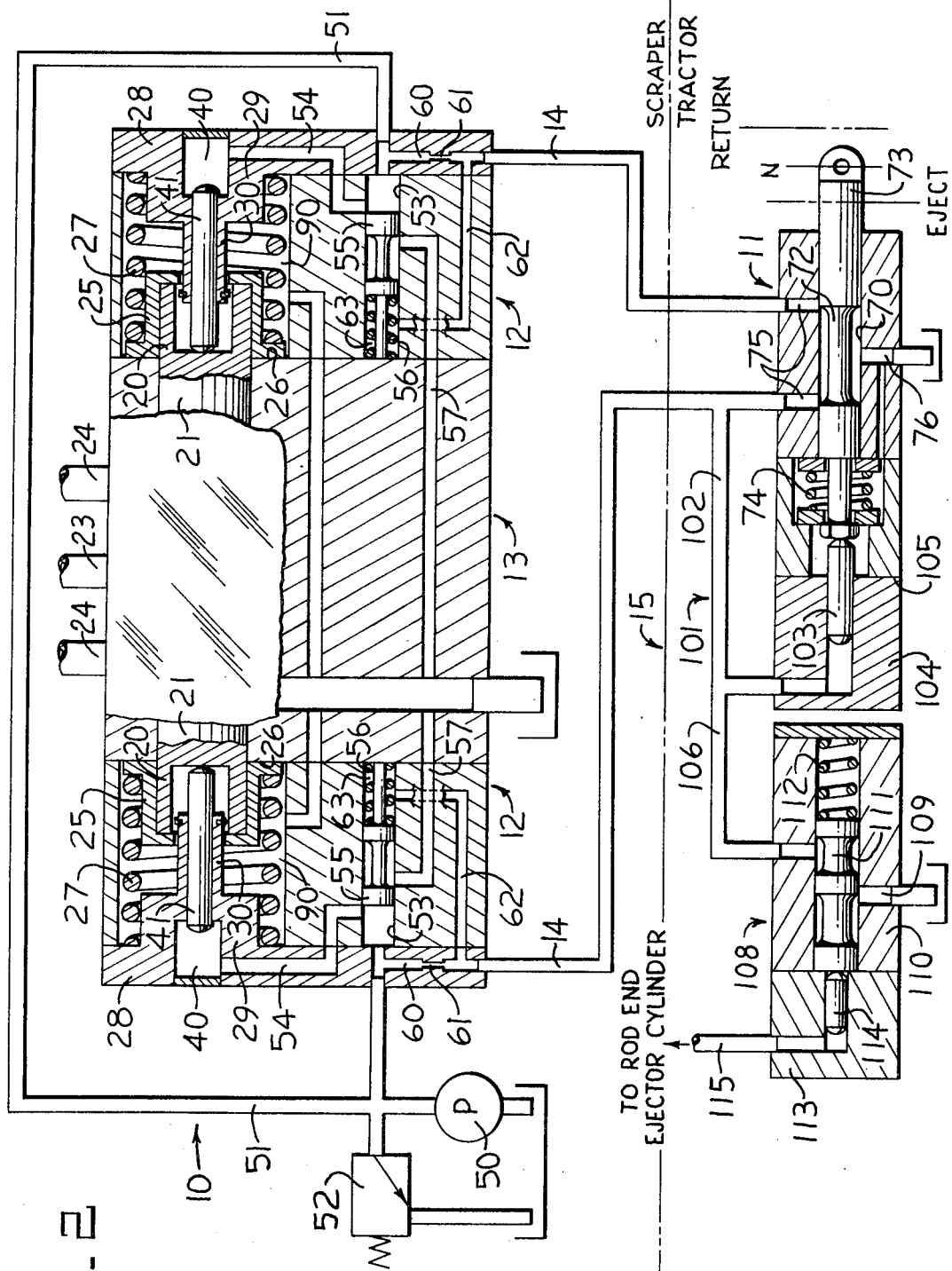

---

3,515,032
PILOT BLEED SYSTEM FOR REMOTE CONTROL VALVE OPERATION
Joseph E. Dezelan, Leon E. Hicks, and Howard L. Johnson, Joliet, Ill., assignors to Caterpillar Tractor Co., Peoria, Ill., a corporation of California
Filed Oct. 31, 1968, Ser. No. 772,246
Int. Cl. F15b 13/02, 21/00
U.S. Cl. 91—51          7 Claims

ABSTRACT OF THE DISCLOSURE

In a master-slave control system for operating hydraulic control valves, located adjacent to their control hydraulic actuators, from a remote location, auxiliary pilot spools located in the slave unit are employed to vent hydraulic pressure on one or the other side of a double-acting hydraulic actuator connected to the control valve whereby the control valve is shifted rapidly when a bleed from either one or the other of the auxiliary pilot spool control chambers is interrupted. An emergency system and a holding circuit can each be utilized in the master-slave control system.

BACKGROUND OF THE INVENTION

In current day earthmoving equipment, such as scrapers, bulldozers, loaders and the like, hydraulic components, such as rams or actuators, are often located a considerable distance from the operator's station and, in order to eliminate the necessity of running a large number of large sized hydraulic lines between the operator's station and the hydraulic component, it is often desirable to locate a control valve adjacent to the component and operate it through a remote control system. Such an arrangement can greatly reduce the length of large size hydraulic lines and, while an obvious expedient, makes the actuation of the control valve dependent upon an adequate master-slave remote control system.

Many of the control valves used for large material handling or earthmoving equipment, such as loaders, graders, bulldozers, power shovels, cranes, etc., use relatively large size control spools and often require a considerable force to shift them from a neutral position to a selected position. Thus, in many cases, it is also necessary that the remote operating system employed be capable of providing the necessary force to shift the control spool of such large size valves.

Master-slave remote control systems are known, and several are illustrated in U.S. Pat. No. 3,048,978 issued to Hare and U.S. Pat. No. 2,807,553 issued to Temple. The systems shown in these two patents are hydraulic master-slave systems, wherein the location of the master unit is remote from the slave unit, the latter being usually closely associated with a control valve. The instant invention is also a hydraulic system but with superior performance and many advantages.

Difficulties are often experienced with the prior art systems since they often depend upon manually generated pressures to shift relatively large size control valves. This often requires that the control hydraulic lines between the master unit and the slave unit be of relatively large size by comparison of those employed in the instant invention. Further, this situation causes the response to be quite slow and sluggish, which is highly undesirable, in operations where fractions of a second count.

One of the reasons for the development of the master-slave system, illustrated herein, was to provide a fast response, reliable master-slave system so that advantage could be taken of the use of remotely located control valves without a sacrifice in either performance response or reliability.

SUMMARY OF THE INVENTION

The instant invention is a master-slave control system for operating large size hydraulic valves, located adjacent to their controlled hydraulic actuators, from a remote control station and includes a pump providing a source of pressure fluid; a slave unit having two separately controlled passages commonly connected to receive pressurized fluid from the pump; a double-acting hydraulic actuator means having one side connected to one of such passages and the other side connected to the other such passage and mechanically linked to a control valve to be actuated; two auxiliary pilot spools, one located in each passage of said slave unit to control the flow of pressure fluid therethrough, each pilot spool means including a bias urging it to close off its passage, a pressure responsive surface for opposing said bias, and a pressure equalizing chamber whereby through pressure equalization on opposite ends of the pilot spool, its bias will close off its passage and dump the fluid in its associate side of the double-acting actuator to drain whereby the control valve will be shifted; and a master unit connected to each pressure equalizing chamber with a separate line and having a flow control element operable to control the pressurization in one or the other equalizing chamber, whereby hydraulic pressure on one side of the double-acting hydraulic actuator will be vented to drain and the pressure fluid on the other side will move the actuator to shift the control valve.

To this basic master-slave system, additional components can be added to provide an emergency source of fluid pressure for operation of the control valve by the master-slave system or a detent and release system for maintaining a particular control valve shift with the master-slave system until an actuator has completed its preselected travel.

BRIEF DESCRIPTION OF THE DRAWINGS

FIG. 1 shows a schematic of the master-slave system with the valve units shown partially in section for greater detail, along with an auxiliary selector valve for providing a source of emergency hydraulic fluid, in case of pump failure; and FIG. 2 illustrates the same master-slave valve system, as shown in FIG. 1, with a detent and release circuit for maintaining a preselected control valve shift until an actuator has completed its travel.

DESCRIPTION OF THE INVENTION

A complete master-slave system 10 is illustrated in FIG. 1 and was designed for employment with an earthmoving scraper for controlling the bowl lift jacks. The master unit 11 and slave unit 12, the latter of which is fabricated with the control valve 13, are designed to operate the control valve from a remote location. The control valve controls the flow of fluid to the bowl carry jacks (not shown) and normally, the master unit is located on the tractor and connected to the slave unit through two small diameter bleed lines 14 which run between the tractor and the location of the bowl carry jacks on the machine where the control valve is also mounted.

Broken lines 15, in the figures serve to illustrate the division between the tractor and the remainder of the machine and it should be appreciated that this arrangement is by way of illustration, and not limitation, since the jacks could be alternatively located on a tractor and still controlled by the same master-slave system.

In the control valve 13, only the ends 20 of the control spool 21 in the composite control valve and slave unit are shown, since fluid control structure of the valve is conventional and the shifting of the control spool merely controls the flow of pressurized fluid, received through inlet 23, to one side or the other side of the bowl carry jacks connected to lines 24 of the unit. Normally, an open-center type control valve is preferred since the pressure in the system is not required until the bowl carry jacks are to be actuated by a shift in the control spool, which normally saves considerable horsepower.

Fitted over each end 20 of the control spool 21 is a flanged cap 25, each of which is urged against a flat surface 26 on the end of the body surrounding its protruding end of the control spool by a centering spring 27. The outboard end of each centering spring is retained by an end plate 28 having an inwardly projecting stepped cylindrical member 29 whose smaller end portion 30 extends through an aperture in its adjacent cap 25 into the hollow end 20 of the adjacent end of the control spool. The larger portion of this member centers the centering spring on the end plate and if the spool is displaced, the centering springs will center or return the control spool to a neutral position when the displacing force is released. This arrangement is conventional.

Displacement of spool 21 of the control valve is accomplished hydraulically through the release of pressure in one or the other opposed actuating chambers 40, one located in each end plate 28 at opposite ends of the control spool. Each actuating chamber includes a plunger 41 which is reciprocably mounted in the end plate so that one end is in communication with its associated actuating chamber and the opposite end is abutted against the hollow end 20 of the control spool. As long as the pressure is equal in both actuating chambers, the centering springs will center the spool. However, if the pressure is released from one actuating chamber, the pressurized fluid in the other actuating chamber will shift the spool toward the vented chamber.

The pilot bleed system of this invention includes the hydraulic circuitry whereby the pressure in the two actuating chambers 40 can be controlled from a remote location with a minimum number and small size hydraulic lines. Since both actuating chambers are pressurized when the spool is centered and one or the other chamber is vented to affect a control spool shift, the shift of the control spool occurs quite rapidly since there is no need to force a large volume of hydraulic fluid through small size hydraulic lines to the actuator portion of the remote control system. Further, the system is capable of operating rather large hydraulic valves, such as those found on the bowl raising jacks and ejector circuits of the earthmoving scraper, since adequate hydraulic power can be developed in the actuators which is not dependent upon pressure from the master unit for actuation.

In the embodiment shown in FIG. 1, a separate pump 50 is used to supply pressurized fluid for the master-slave system 10 since this eliminates the need to fully pressurize the jack actuating system, which usually requires a large size implement pump, which, when pressurized, consumes considerable horsepower. However, it should be appreciated that both the pilot and jack actuating system could be supplied pressurized fluid from a common pump, if this is desirable.

Pressurized fluid for the actuation of the hydraulic actuator for shifting the control spool is provided by pump 50 which pressurizes the conduit 51 to a pressure determined by the setting of the relief valve 52. This conduit delivers hydraulic pressure to ports in both the end plates 28 of the slave unit 12, adjacent to each actuating chamber 40. Behind each end plate is a blind bore 53 in the body of the slave unit which communicates with its associated actuating chamber through passage 54 in order that pressure from conduit 51 can be applied to the plungers 41 acting on opposite ends of the control spool 21.

To shift the control spool, the pressure in one of the other actuating chambers must be vented so that the pressure unvented chamber can shift the spool toward the vented chamber through its plunger 41. In order to control the pressure in the actuating chamber, each blind bore 53 contains a pilot spool 55 which includes a biasing spring 56 that shifts the pilot spool to close off the pump pressure to passage 54 and connect this passage to a drain passage 57, so that the hydraulic fluid will be vented from this actuating chamber. These pilot spools are arranged so that the pressurized fluid from pump 50 will shift each pilot spool toward its biasing spring and open the communication between conduit 51 and line 54 to their actuating chambers, on both sides of the slave unit. A fully pressurized situation is shown in the attached drawing.

In order for the pilot spool to shift to close off the pressurized fluid to its associated actuating chamber, the pressure on opposite ends of the pilot spool must be equalized so that the biasing spring can shift the spool to connect its passage 54 to drain passage 57. This pressure equalization on opposite sides of each pilot spool is affected by a tap line 60 from conduit 51 which includes an orifice 61 and a passage 62 downstream of the orifice which connects to a equalizing chamber 63 at the opposite end of the associated pilot spool. Each passage 62 is also in communication with a separate bleed line 14 which connects the slave unit with the master unit and as long as pressurized fluid escapes through its bleed line, it is not possible for pressure equalization to occur, thus the pilot spool will be maintained in the position shown in FIG. 1. However, if the master unit stops the bleed of fluid through one or the other bleed line, immediately pressure is equalized on both sides of the associated pilot spool and spring 56 will shift it to vent its actuation chamber to drain. This action, of course, will allow one of the actuating chambers to be vented which the other remains pressurized and the control spool 21 to shift toward the vented chamber.

It should be appreciated that since the actuation chambers are under "pressure" until a control spool shift occurs, the shift will occur relatively rapidly and the response of the slave to the movement of the master will be almost instantaneous.

Bleed lines 14 connecting the slave 12 with the master 11 can be of small diameter and need have only a capacity slightly greater than orifices 61 associated with them in order to prevent the pressure from equalizing on the opposite side of the pilot spool, which each line controls. As a result, only small bleed lines need be run from the slave units, across the machine to the operator's station, where the master unit is usually located.

In the master unit, the two bleed lines are commonly connected to a central bore 70 in its body 71, at spaced locations, so that a reduced center portion 72 of a master spool 73, when centered by its associated centering spring 74, will allow both bleed ports 75, to which the bleed lines are connected, to vent to reservoir via port 76. If the master spool is manually shifted either direction, one or the other bleed ports will be closed while the other will remain open. This will effect an immediate shifting of the control spool, as previously described.

The current master-slave system was developed for use in an earthmoving scraper wherein the bowl is often lowered to contact the ground in an emergency situation, such as when the scraper brakes are unable to stop the machine or brake failure has occurred. However, when using a remote control system, it is necessary that adequate hydraulic pressure be available to operate the system should a complete hydraulic failure in the machine occur in such situations so that the bowl can be lowered as an emergency measure. Thus, the master-slave control system in FIG. 1 is shown with an emergency source of pressurized fluid for operating the control valve should pump 50 fail. In a scraper this source of pressurized fluid is obtained from one side of the bowl carry jacks which support the bowl and, therefore, have an available source of pressurized fluid if a bleed is taken therefrom. Obviously, if the bowl is on the ground, the machine would be in a safe condition and an emergency source of pressure would not be required.

When the bowl is in a raised position, the pressure in the bowl carry jacks, referred to as "bowl carry pressure," will be dependent on whether the bowl is filled or unfilled with earth, however, even an empty bowl provides adequate pressure. A source of emergency pressurized fluid is thus provided by connecting line 80 to that side of the bowl carry jacks in which bowl carry pressure is available and coupling this line to a selector valve 81 which includes a shuttle spool 83 that controls the connection of the bowl carry pressure, through orifice 84 to a reduced center section of selector spool 85. Normally pump pressure, through line 51a, acting on one end of the shuttle spool will cut off bowl carry pressure through this orifice, but its spring will open this communication any time pump pressure is lost.

The selector spool 85 has three lands and is reciprocably mounted in the bore in the selector valve body so it can communicate the bowl carry pressure to a port 86 when this spool is displaced into its spring 87. When this port is in communication with the bowl carry pressure it will pressurize line 88 connected to a passage 89 in the slave unit which communicates with a spring chamber 90 containing one of the centering springs 25. Pressure in this chamber will act directly on one end 20 of control spool 21, causing it to shift in a direction to lower the bowl. A relief valve 91 in line 88 prevents excessive pressure from developing in the spring chamber.

Normally the shuttle spool 85 will be in the position illustrated in FIG. 1 since pressure from line 80, which is communicated through a small axial bore 92 in the spool to its spring chamber 93, will balance the pressures at its opposite ends allowing spring 87 to hold it in the position illustrated. In this position line 88 communicates directly to reservoir through port 86 and port 94, as illustrated.

A small diameter line 95 communicates with chamber 93 and connects it with the master unit 11 where it is normally closed by the master spool 72, until this spool is placed in the "L" or bowl lower position at which time it vents chamber 93. This will allow pressure in line 80 to shift the selector spool so port 86 will be in communication with orifice 84. However, unless pump 50 has failed, this passage will not be pressurized since the shuttle spool will close it from communications with line 80. With this system, the bowl carry pressure will automatically be connected to provide an emergency source of pressure and the operator will be able to lower the bowl for safety purposes at anytime.

In FIG. 2 an identical master-slave system 10 is shown and parts identical to those shown in FIG. 1 are designated with the same numeral. This system includes a holding hydraulic circuit 101 so that the master unit 11 can be positioned to "position" under conditions that the holding circuit will maintain the master unit in this position until an actuator has completed its movement. Typical of such a situation in which such a circuit is desirable is an ejector of a scraper which is to be returned to its retracted position and the operator does not desire to hold the master unit in an "on" position for time necessary for the ejector to retract.

This holding circuit taps pressure through line 102 from bleed line 14 which is pressurized when the operator places the spool 73 to the "return" or "R" position with hand linkages (not shown). Fluid pressure acts on plunger 103 in a body unit 104 which attaches to the end 105 of the master unit so that its plunger 103 can abut on master spool 73, holding it in the "return" position until the pressure is released in line 102, at which time the centering spring will return the master spool to neutral.

The release of the pressure in holding circuit is accomplished by venting the pressure in line 102 via a line 106 connected thereto, through a shuttle valve 108 to drain 109. In the body 110 of the shuttle valve, a shuttle spool 111 is biased by spring 112 to a position which prevents line 106 from communicating with the drain. Shifting the shuttle spool into its spring will affect a communication between line 106 and drain, thereby relieving the pressure on plunger 103 and allowing the centering spring to move the master spool 73 to "neutral" or "N," as shown in the drawings.

Normally, a spring is selected which will hold the shuttle spool in the position indicated in FIG. 2 as retraction occurs. To cause the shuttle spool to shift, an end cap 113 containing the piston 114 is attached to the end of body 110, as shown in FIG. 2, so one end of its piston abuts on the shuttle spool. The opposite end of this piston communicates with one side of the hydraulic actuator, for example, the rod end of the ejector cylinder, through line 115 and when the pressure rises after the end of the travel of the actuator, the increased pressure on the piston will overcome spring 112 and move the shuttle spool to vent the pressure from line 102. Spring 112 must be selected with care in order to insure that the shuttle spool will move under the available system pressure after the actuator has completed its travel.

While the instant invention has been disclosed in scraper environment, it can be apreciated that the illustrated systems could work effectively in other equipment such as bulldozers, loaders, graders, etc. Thus, it is not intended to limit the instant invention by an environmental applications discussed herein.

It should be appreciated that no flow through the pilot lines 14 is required to accomplish a shift of the control valve spool which makes the response of this system largely independent of the size of these bleed lines. Because of this feature, miniature lines can be used for connecting the master and slave units without sacrifice of response.

What is claimed is:

1. A quick response master-slave control system for operating hydraulic control valves located adjacent to their controlled hydraulic actuators, from remote locations comprising:

a source of pressurized fluid;
a slave unit having two separately controlled fluid passages therein, both said passages commonly connected to receive pressurized fluid from said source;
a double-acting hydraulic actuator linked to a control valve and having one side connected to one fluid passage and the other side connected to the other fluid passage in said slave unit;
a pair of pilot spool means, one located in each fluid passage of said slave unit, each pilot spool means having biasing means urging it to close off the pressurized fluid to said double-acting hydraulic actuator through its passage and having a reaction surface whereby the pressurized fluid will cause said pilot spool means to overcome its biasing means thereby opening its passage;
a pressure equalizing means associated with each pilot spool means whereby pressures may be equalized on opposite ends of each pilot spool means, thereby allowing its associated biasing means to close off pressurized fluid therethrough to said double-acting hydraulic actuator and connect said side to drain;
a master unit connected to both pressure equalizing means through separate conduits, said master unit including fluid control means operable to activate one or the other pressure equalizing means whereby the associated pilot spool closes off the source of pressurized fluid to one side of said double-acting hydraulic actuator and connects it to drain allowing the pressurized fluid operating on the other side to quickly shift the control element of said control valve.

2. The quick response master-slave control system as defined in claim 1 including an emergency operating system having a selector valve means connected to the master unit through a fluid conduit, an alternate source of pressurized fluid connected to said selector valve and an independent actuator associated with the control valve whereby actuation of the selector valve by the master unit will cause said control valve to be displaced even though the normal source of pressurized fluid is lost in the master-slave system.

3. The quick response master-slave system as defined in claim 2 wherein the alternate source of pressurized fluid is a hydraulic actuator under load.

4. The quick response master slave control system as defined in claim 1 wherein each pressure equalizing means includes a chamber associated with each pilot spool means which has communication with the source of pressurized fluid through an orifice means and has a bleed port with a greater fluid capacity than said orifice means.

5. The quick response master-slave control system as defined in claim 3 wherein the master unit includes a control element for restricting the flow of pressurized fluid from alternately one or the other bleed port whereby pressurized fluid is vented to drain from one or the other side of the double-acting hydraulic actuator.

6. The quick response master-slave control system as defined in claim 1 wherein a hydraulic ram with plunger is connected to one of the conduits between the slave and the master, said plunger positioned to abut on the control element of said master unit and operable to hold said element against its centering spring forces when pressurized and a dump valve operable to release the fluid pressure on said plunger when an actuator has completed its travel.

7. The quick response master-device control system as defined in claim 6 wherein the dump valve is connected to the controlled actuator through a hydraulic line and includes a plunger and spool system which are responsive to the pressure peak at the end of the actuator traveled to release the control element of the master valve.

References Cited

UNITED STATES PATENTS

| | | | |
|---|---|---|---|
| 2,139,173 | 12/1938 | Romaine et al. | 91—461 X |
| 2,369,505 | 2/1945 | Ward | 91—51 X |
| 2,507,868 | 5/1950 | Purcell | 91—461 X |
| 2,879,644 | 3/1959 | Caslow et al. | 91—461 X |

MARTIN P. SCHWADRON, Primary Examiner

I. C. COHEN, Assistant Examiner

U.S. Cl. X.R.

91—426, 461; 137—625.61